US011601219B2

(12) United States Patent
Liu et al.

(10) Patent No.: US 11,601,219 B2
(45) Date of Patent: Mar. 7, 2023

(54) INTERLEAVING OF COMBINATIONS OF MULTIPLE RESOURCE UNITS IN WLAN

(71) Applicant: MediaTek Singapore Pte. Ltd., Singapore (SG)

(72) Inventors: Jianhan Liu, San Jose, CA (US); Shengquan Hu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 45 days.

(21) Appl. No.: 17/114,461

(22) Filed: Dec. 7, 2020

(65) Prior Publication Data
US 2021/0194630 A1    Jun. 24, 2021

Related U.S. Application Data

(60) Provisional application No. 62/951,196, filed on Dec. 20, 2019.

(51) Int. Cl.
*H04L 1/00* (2006.01)
*H04L 1/1829* (2023.01)
*H04W 84/12* (2009.01)

(52) U.S. Cl.
CPC .......... *H04L 1/0071* (2013.01); *H04L 1/0007* (2013.01); *H04L 1/0041* (2013.01); *H04L 1/1861* (2013.01); *H04W 84/12* (2013.01)

(58) Field of Classification Search
CPC ... H04L 1/0071; H04L 1/0007; H04L 1/0041; H04L 1/1861; H04W 84/12
See application file for complete search history.

(56) References Cited

U.S. PATENT DOCUMENTS

2017/0041929 A1*  2/2017  Noh ................. H04L 5/0053
2017/0104553 A1*  4/2017  Liu ................. H04L 27/2613
(Continued)

FOREIGN PATENT DOCUMENTS

CN    105814829 A    7/2016
CN    107113140 A    8/2017
(Continued)

OTHER PUBLICATIONS

Taiwan Intellectual Property Office, Office Action for Taiwan Patent Application No. 109143351, dated Feb. 26, 2021.
(Continued)

*Primary Examiner* — Kent Krueger
(74) *Attorney, Agent, or Firm* — Han IP PLLC; Andy M. Han

(57) ABSTRACT

Various proposed schemes pertaining to interleaving of combinations of multiple resource units (RUs) in wireless local area networks (WLANs) are described. In one example, data in a service data unit (SDU) is processed. The process data is then transmitted to a receiving entity over at least some of a plurality of resource units (RUs). The processing of the data involves either: (i) performing tone mapping by using one joint tone interleaver on one or more combinations of multiple RUs of the plurality of RUs within one frequency segment of a predefined bandwidth; or (ii) performing tone mapping by using multiple tone interleavers on the one or more combinations of multiple RUs of the plurality of RUs over multiple frequency segments of the predefined bandwidth.

20 Claims, 11 Drawing Sheets

400

(A)

| PARAMETERS | MULTI-RU COMBINATIONS | |
|---|---|---|
| | RU52 + RU26 | RU106 + RU26 |
| $D_{TM}$ | 3 OR 6 | 6 |
| $D_{TM\_DCM}$ | 3 | 3 |

(B)

| PARAMETERS | MULTI-RU COMBINATIONS | |
|---|---|---|
| | RU242 + RU242 | RU242 + RU484 |
| $D_{TM}$ | 12 | 18 |
| $D_{TM\_DCM}$ | 9 | 9 |

NOTE:
• $D_{TM}$ = DISTANCE OF TONE MAPPING
• $D_{TM\_DCM}$ = DISTANCE OF TONE MAPPING WITH DUAL-CARRIER MODULATION

(56) References Cited

U.S. PATENT DOCUMENTS

| | | | |
|---|---|---|---|
| 2017/0126447 A1* | 5/2017 | Yang | H04L 1/0071 |
| 2018/0248591 A1* | 8/2018 | Geng | H04B 7/0413 |
| 2019/0141717 A1* | 5/2019 | Yang | H03M 13/6527 |
| 2019/0281614 A1* | 9/2019 | Chen | H04L 5/0041 |
| 2019/0313424 A1* | 10/2019 | Choi | H04W 72/12 |
| 2020/0305164 A1* | 9/2020 | Yang | H04L 27/2605 |
| 2021/0044398 A1* | 2/2021 | Noh | H04L 5/0023 |
| 2021/0126735 A1* | 4/2021 | Gan | H04L 1/0068 |
| 2021/0144695 A1* | 5/2021 | Agrawal | H04L 5/0007 |
| 2021/0160889 A1* | 5/2021 | Yang | H04L 5/0007 |

FOREIGN PATENT DOCUMENTS

| | | |
|---|---|---|
| CN | 107919945 A | 4/2018 |
| CN | 108206727 A | 6/2018 |
| CN | 108886420 A | 11/2018 |
| EP | 3078150 A1 | 10/2016 |
| WO | WO 2017044591 A1 | 3/2017 |

OTHER PUBLICATIONS

European Patent Office, European Search Report for European Patent Application No. 20213847.5, dated Jun. 10, 2021.
China National Intellectual Property Administraion, Second Office Action for China Patent Application No. 202011444334.X, dated Jun. 6, 2022.

* cited by examiner

300

80 MHz BANDWIDTH

| RU COMBINATIONS |
|---|
| 242 + 242 |
| 484 + 242 |

160 / 80 + 80 MHz BANDWIDTH

| 80 MHz | 80 MHz | RU COMBINATIONS |
|---|---|---|
| 484 | 996 | 484 + 996 |
| 242 + 242 | 996 | (242 + 242) + 996 |
| 484 + 242 | 484 + 242 | (484 + 242) + (484 + 242) |
| 484 + 242 | 996 | (484 + 242) + 996 |

SOME EXAMPLE RU COMBINATIONS IN 320 MHz BANDWIDTH

| 80 MHz | 80 MHz | 80 MHz | 80 MHz | RU COMBINATIONS |
|---|---|---|---|---|
| 484 | 996 | 996 | 996 | 484 + 996 + 484 + 996 |
| 484 + 242 | 996 | 484 + 242 | 996 | (484 + 242) + 996 + (484 + 242) + 996 |
| 484 + 242 | 484 + 242 | 484 + 242 | 484 + 242 | (484 + 242) + (484 + 242) + (484 + 242) + (484 + 242) |
| ... | ... | ... | ... | ... |

400

(A)

| PARAMETERS | MULTI-RU COMBINATIONS | |
|---|---|---|
| | RU52 + RU26 | RU106 + RU26 |
| $D_{TM}$ | 3 OR 6 | 6 |
| $D_{TM\_DCM}$ | 3 | 3 |

(B)

| PARAMETERS | MULTI-RU COMBINATIONS | |
|---|---|---|
| | RU242 + RU242 | RU242 + RU484 |
| $D_{TM}$ | 12 | 18 |
| $D_{TM\_DCM}$ | 9 | 9 |

NOTE:
- $D_{TM}$ = DISTANCE OF TONE MAPPING
- $D_{TM\_DCM}$ = DISTANCE OF TONE MAPPING WITH DUAL-CARRIER MODULATION

FIG. 4

| RUs IN THE 1ST 80-MHZ SEGMENT | RUs IN THE 2ND 80-MHZ SEGMENT | INTERLEAVING SCHEMES |
|---|---|---|
| 484 | 996 | TWO SEPARATE INTERLEAVERS:<br>1. ONE INTERLEAVES OVER RU484;<br>2. THE OTHER INTERLEAVES OVER RU996 |
| 996 | 484 | |
| 242 + 242 | 996 | TWO SEPARATE INTERLEAVERS:<br>1. ONE INTERLEAVES OVER RU242 + RU242;<br>2. THE OTHER INTERLEAVES OVER RU996 |
| 996 | 242 + 242 | |
| 484 + 242 | 484 + 242 | TWO SEPARATE INTERLEAVERS:<br>1. ONE INTERLEAVES OVER RU484 + RU242 IN THE 1ST 80-MHZ SEGMENT;<br>2. THE OTHER INTERLEAVES OVER RU484 + RU242 IN THE 2ND 80-MHZ SEGMENT |
| 484 + 242 | 996 | TWO SEPARATE INTERLEAVERS:<br>1. ONE INTERLEAVES OVER RU484 + RU242;<br>2. THE OTHER INTERLEAVES OVER RU996 |
| 996 | 484 + 242 | |

PROCESS DATA BY INTERLEAVING THE DATA OVER AT LEAST SOME OF A PLURALITY OF RESOURCE UNITS (RUs)
1110

INTERLEAVE ONE OR MORE COMBINATIONS OF MULTIPLE RUs OF THE PLURALITY OF RUs BY USING ONE JOINT INTERLEAVER, IN AN EVENT THAT A SIZE OF EACH RU OF THE MULTIPLE RUs IS LESS THAN A PREDEFINED SIZE
1112

INTERLEAVE ONE OR MORE COMBINATIONS OF THE MULTIPLE RUs OF THE PLURALITY OF RUs BY USING THE ONE JOINT INTERLEAVER, IN AN EVEN THAT A SIZE OF EACH RU OF THE MULTIPLE RUs IS GREATER THAN OR EQUAL TO THE PREDEFINED SIZE, RESPONSIVE TO THE MULTIPLE RUs BEING WITHIN ONE CONTIGUOUS FREQUENCY SEGMENT OF A PREDEFINED BANDWIDTH
1114

INTERLEAVE THE ONE OR MORE COMBINATIONS OF THE MULTIPLE RUs OF THE PLURALITY OF RUs BY USING MULTIPLE TONE INTERLEAVERS RESPONSIVE TO THE MULTIPLE RUs BEING OVER MULTIPLE FREQUENCY SEGMENTS OF THE PREDEFINED BANDWIDTH
1116

TRANSMIT THE PROCESSED DATA TO A RECEIVING ENTITY
1120

FIG. 11

INTERLEAVING OF COMBINATIONS OF MULTIPLE RESOURCE UNITS IN WLAN

CROSS REFERENCE TO RELATED PATENT APPLICATION

The present disclosure is part of a non-provisional patent application claiming the priority benefit of U.S. Provisional Patent Application No. 62/951,196, filed on 20 Dec. 2019, the content of which being incorporated by reference in its entirety.

TECHNICAL FIELD

The present disclosure is generally related to wireless communications and, more particularly, to interleaving of combinations of multiple resource units (RUs) in wireless local area networks (WLANs).

BACKGROUND

Unless otherwise indicated herein, approaches described in this section are not prior art to the claims listed below and are not admitted as prior art by inclusion in this section.

For next-generation WLANs based on the upcoming Institute of Electrical and Electronics Engineers (IEEE) standards such as the IEEE 802.11 be, a resource unit (RU) is defined as a group of subcarriers that are allocated and available for transmission. The size of an RU can be 26, 52, 106, 242, 484, 996 and 2*996 subcarriers with subcarrier spacing of about 78.1 kHz. Correspondingly, the number of data tones $N_{SD}$ for each RU can be 24, 48, 102, 234, 468 and 980, respectively.

To improve spectral usage, IEEE 802.11be allows multiple RUs to be assigned to a single station (STA). Regarding transmissions over multiple RUs (or multi-RUs), data over multi-RUs for one STA can be transmitted at a physical (PHY) layer of a transmitting entity using one Physical Layer Convergence Procedure (PLCP) service data unit (PSDU) received from a medium access control (MAC) layer of the transmitting entity, and information bits for multi-RUs are encoded jointly. However, there is a need for different interleaving schemes for multi-RUs to achieve a good tradeoff between system complexity and performance.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to interleaving of combinations of multi-RUs in WLANs. Under various proposed schemes in accordance with the present disclosure, it is believed that a better tradeoff between system complexity and performance may be achieved with the various interleaving schemes proposed herein for transmission of multi-RUs.

In one aspect, a method may involve processing data in a service data unit (SDU). The method may also involve transmitting the processed data to a receiving entity over at least some of a plurality of RUs. In processing the data, the method may involve either: (i) performing tone mapping by using one joint tone interleaver on one or more combinations of multiple RUs of the plurality of RUs within one frequency segment of a predefined bandwidth; or (ii) performing tone mapping by using multiple tone interleavers on the one or more combinations of multiple RUs of the plurality of RUs over multiple frequency segments of the predefined bandwidth.

In another aspect, a method may involve processing data by interleaving the data over at least some of a plurality of RUs. The method may also involve transmitting the processed data to a receiving entity. The interleaving of the data over at least some of the plurality of RUs may involve: (i) interleaving one or more combinations of multiple RUs of the plurality of RUs by using one joint interleaver, in an event that a size of each RU of the multiple RUs is less than a predefined size; or (ii) interleaving the one or more combinations of the multiple RUs of the plurality of RUs by using the one joint interleaver, in an even that a size of each RU of the multiple RUs is greater than or equal to the predefined size, responsive to the multiple RUs being within one contiguous frequency segment of a predefined bandwidth; or (iii) interleaving the one or more combinations of the multiple RUs of the plurality of RUs by using multiple tone interleavers responsive to the multiple RUs being over multiple frequency segments of the predefined bandwidth. The predefined size may be 242, and the predefined bandwidth may be 80 MHz.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 4 is a diagram of an example scenario of joint tone interleaving schemes for multi-RU combinations in accordance with an implementation of the present disclosure.

FIG. 5 is a diagram of an example scenario of joint tone interleaving schemes for multi-RU combinations in accordance with an implementation of the present disclosure.

FIG. 11 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to interleaving of combinations of multi-RUs in WLANs. According to the present disclosure, a number of possible solutions may be implemented separately or jointly. That is, although these possible solutions may be described below separately, two or more of these possible solutions may be implemented in one combination or another. It is noteworthy that, although examples described herein and illustrated in the figures may show a first RU of size A and a second RU of size B, as in RU A+RU B, various proposed schemes in accordance with the present disclosure may be implemented with RU A+RU B, or vice versa (e.g., RU B+RU A). In other words, the scope of the present disclosure is not limited to the examples presented herein and, rather, also covers variations thereof. For instance, for a multi-RU group (996+484), the order of RUs may be exchanged in different implementations such as, for example, a first RU of size 484 plus a second RU of size 996 in one implementation or, alternatively, a first RU of size 996 plus a second RU of size 484 in another implementation.

Figure 1:
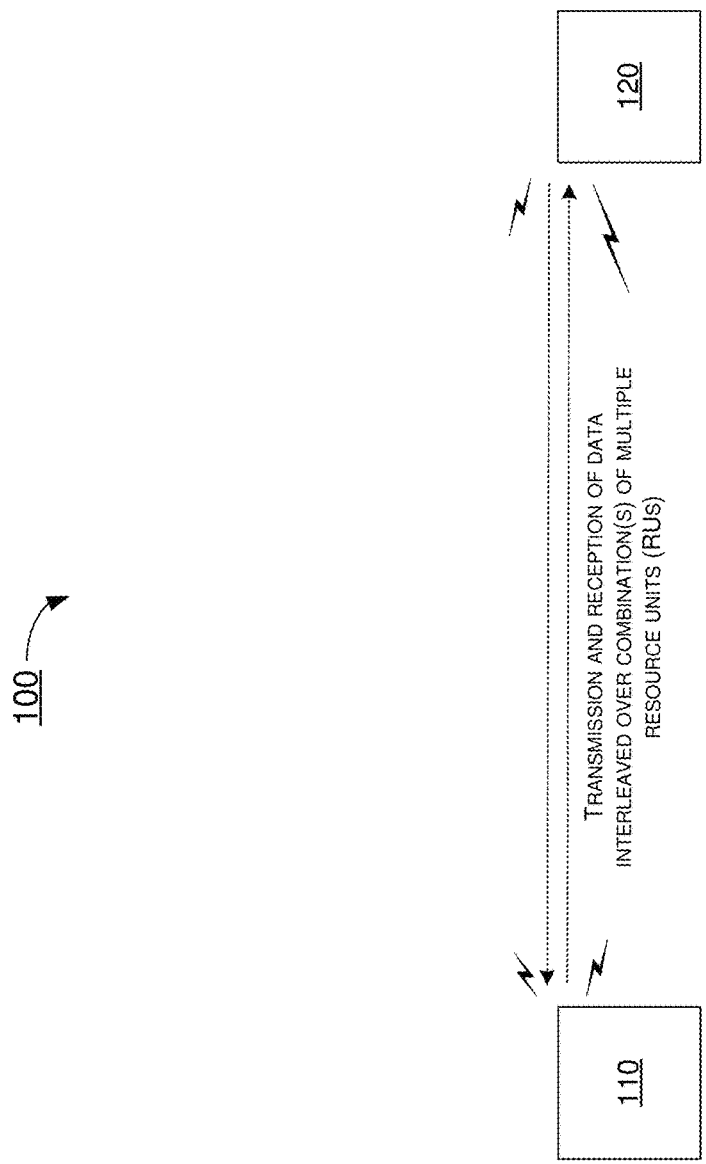
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 8 illustrate examples of implementation of various proposed schemes in network environment 100 in accordance with the present disclosure. The following description of various proposed schemes is provided with reference to FIG. 1~FIG. 8.

Referring to FIG. 1, network environment 100 may involve a communication entity 110 and a communication entity 120 communicating wirelessly (e.g., in a WLAN in accordance with one or more IEEE 802.11 standards). For instance, communication entity 110 may be a station (STA) or an access point (AP), and communication entity 120 may be a STA or an AP. Under various proposed schemes in accordance with the present disclosure, communication entity 110 and communication entity 120 may be configured to perform interleaving of combinations of multi-RUs, as described herein.

Figure 2:
FIG. 2 is a diagram of an example scenario of RU combinations in accordance with an implementation of the present disclosure.

FIG. 2 illustrates an example scenario 200 of RU combinations in accordance with an implementation of the present disclosure. Scenario 200 shows examples of possible RU combinations for small-size RUs such as RUs with a size less than 242. More specifically, scenario 200 shows examples of possible RU combinations in the 20 MHz bandwidth, the 40 MHz bandwidth, and the 80 MHz bandwidth. In scenario 200, one combination of small RUs may be limited to within 20 MHz. Referring to FIG. 2, an RU of size 52, or having 52 tones (herein interchangeably denoted as "RU52"), may be combined with an RU of size 26, or having 26 tones (herein interchangeably denoted as "RU26"). Also, as shown in FIG. 2, an RU of size 106, or having 106 tones (herein interchangeably denoted as "RU106"), may be combined with an RU26 (e.g., in the 80 MHz bandwidth). In the interest of brevity, the term "RUx" denotes an RU of a size x, or having x tones, in the present disclosure. In FIG. 2, the term "DC" stands for direct current.

In scenario 200, under a proposed scheme in accordance with the present disclosure, certain combinations of RUs may be permissible or otherwise allowable/permissible. For instance, one or more pairs of adjacent and non-overlapping RU26 and RU52, each separated by one or more unused tones in the frequency domain, may be combined. Examples of permissible RU26+RU52 combinations under the proposed scheme are shown in part (A) of FIG. 2 for the 20 MHz bandwidth, part (B) of FIG. 2 for the 40 MHz bandwidth, and part (C) of FIG. 2 for the 80 MHz bandwidth. Moreover, one or more pairs of adjacent and non-overlapping RU26 and RU106, each separated by one or more unused tones in the frequency domain, may be combined. Examples of permissible RU26+RU106 combinations under the proposed scheme are shown in part (D) of FIG. 2 for the 80 MHz bandwidth.

In scenario 200, in every 20-MHz frequency band, one combination of small RUs may be allowed. Thus, there may be one combination of RU26+RU52 within the 20 MHz frequency segment as shown in part (A) of FIG. 2; there may be two combinations of RU26+RU52 within the 40 MHz frequency segment as shown in part (B) of FIG. 2; there may be four combinations of RU26+RU52 within the 80 MHz frequency segment as shown in part (C) of FIG. 2; and there may be four combinations of RU26+RU106 within the 80 MHz frequency segment as shown in part (D) of FIG. 2.

Figure 3:
FIG. 3 is a diagram of an example scenario of RU combinations in accordance with an implementation of the present disclosure.

FIG. 3 illustrates an example scenario 300 of RU combinations in accordance with an implementation of the present disclosure. Scenario 300 shows examples of possible RU combinations for large-size RUs such as RUs with a size greater than or equal to 242. More specifically, scenario 300 shows examples of possible RU combinations in the 80 MHz bandwidth, the 160 MHz bandwidth, the 240 MHz bandwidth, and the 320 MHz bandwidth. In scenario 300, for the 240 MHz bandwidth or the 320 MHz bandwidth, RU combinations may be based on 160 MHz and 80+80 MHz. Moreover, for the 240 MHz bandwidth and the 320 MHz bandwidth, there may be three or four RUs combined together.

Regarding low-density parity-check (LDPC) tone interleavers, as defined in current WLAN specifications (e.g., for IEEE 802.11ax and IEEE 802.11ac), there are $N_{SD}$ quadrature amplitude modulation (QAM) symbols per stream per orthogonal frequency-division multiplexing (OFDM) symbol after parsing and constellation mapping. To achieve a better tradeoff between system complexity and performance, various interleaving schemes for multi-RU combinations are proposed herein. Under one proposed scheme in accordance with the present disclosure, one joint tone interleaver may be applied to, or utilized for, combined multiple URs within one 80-MHz frequency segment. Under another proposed scheme in accordance with the present disclosure, separate tone interleavers may be applied to, or utilized for, RUs or combined multi-RUs in different 80-MHz frequency segments. It is noteworthy that, for multi-RU combinations (e.g., RU242+RU996, RU484+RU996, (RU242+RU484)+RU996), joint tone interleaving schemes may not perform well due to the distance of tone mapping (DIM) could only be 4.

FIG. 4 illustrates an example scenario 400 of joint tone interleaving schemes for multi-RU combinations in accordance with an implementation of the present disclosure. Scenario 400 shows examples of joint tone interleaving schemes for multi-RU combinations in one 80-MHz frequency segment under a proposed scheme in accordance with the present disclosure. Referring to part (A) of FIG. 4, for small-RU combinations (e.g., RU52+RU26 or RU106+RU26), the joint interleaving scheme may be applied. For large-RU Combinations (e.g., RU242+RU242 and RU242+RU484), the joint tone interleaving scheme may also be applied in case they are within one contiguous 80-MHz frequency segment. That is, under the proposed scheme, one joint tone interleaver may be applied to, or utilized for, all the data tones contained in the combined multi-RUs.

FIG. 5 illustrates an example scenario 500 of joint tone interleaving schemes for multi-RU combinations in accordance with an implementation of the present disclosure. Scenario 500 shows examples of separate interleaving schemes for RUs or multi-RU combinations in different 80-MHz frequency segments. Referring to FIG. 5, separate tone interleaving schemes proposed in accordance with the present disclosure for 160 MHz and 80+80 MHz are shown.

Figure 6:
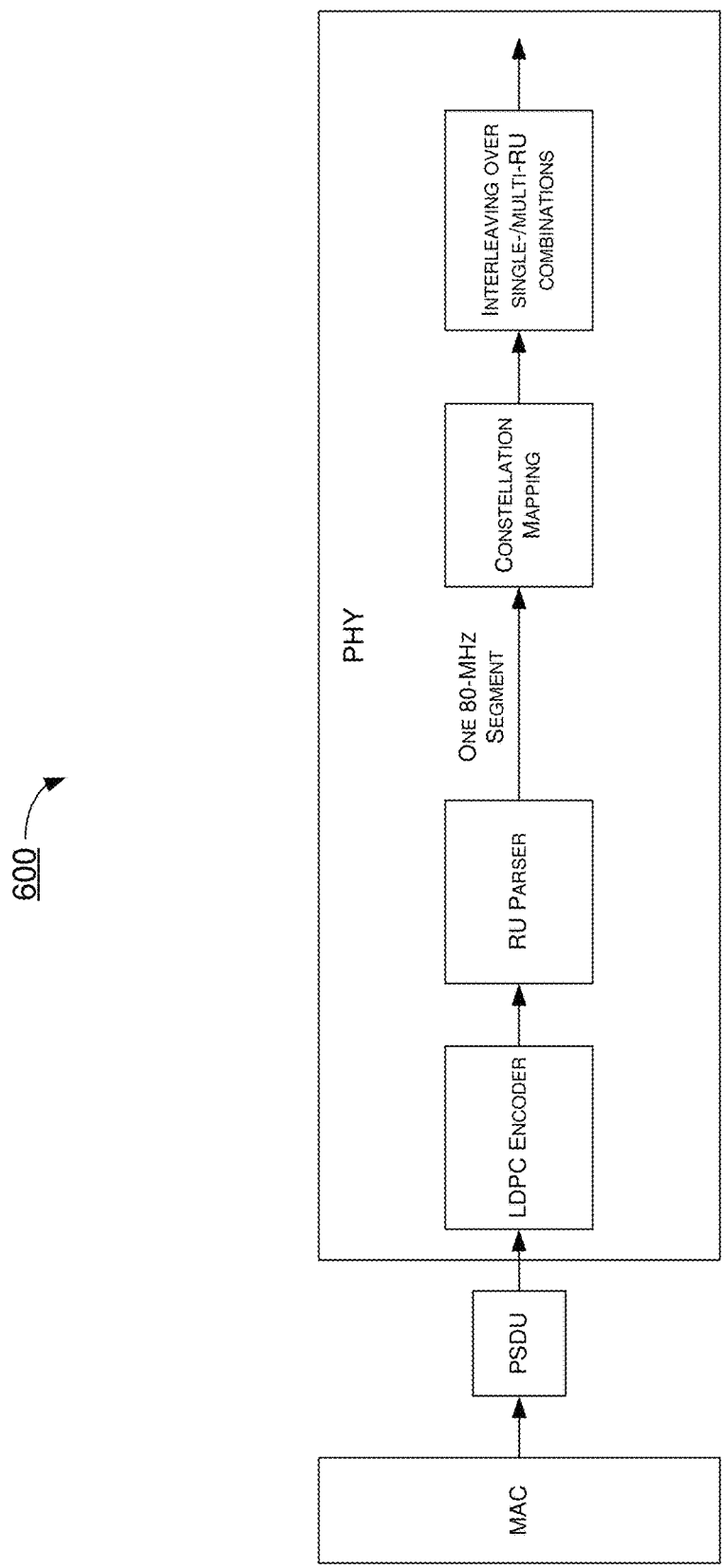
FIG. 6 is a diagram of an example architecture of interleaving for multi-RU combinations in accordance with an implementation of the present disclosure.

FIG. 6 illustrates an example architecture 600 of interleaving for multi-RU combinations in accordance with an implementation of the present disclosure. In architecture 600, for RUs or combined multi-RUs within one 80-MHz frequency segment, the same QAM modulation may be used based on channel state information (CSI) and clear channel assessment (CCA) results at the transmitter. In architecture 600, a single interleaver may be utilized.

Figure 7:
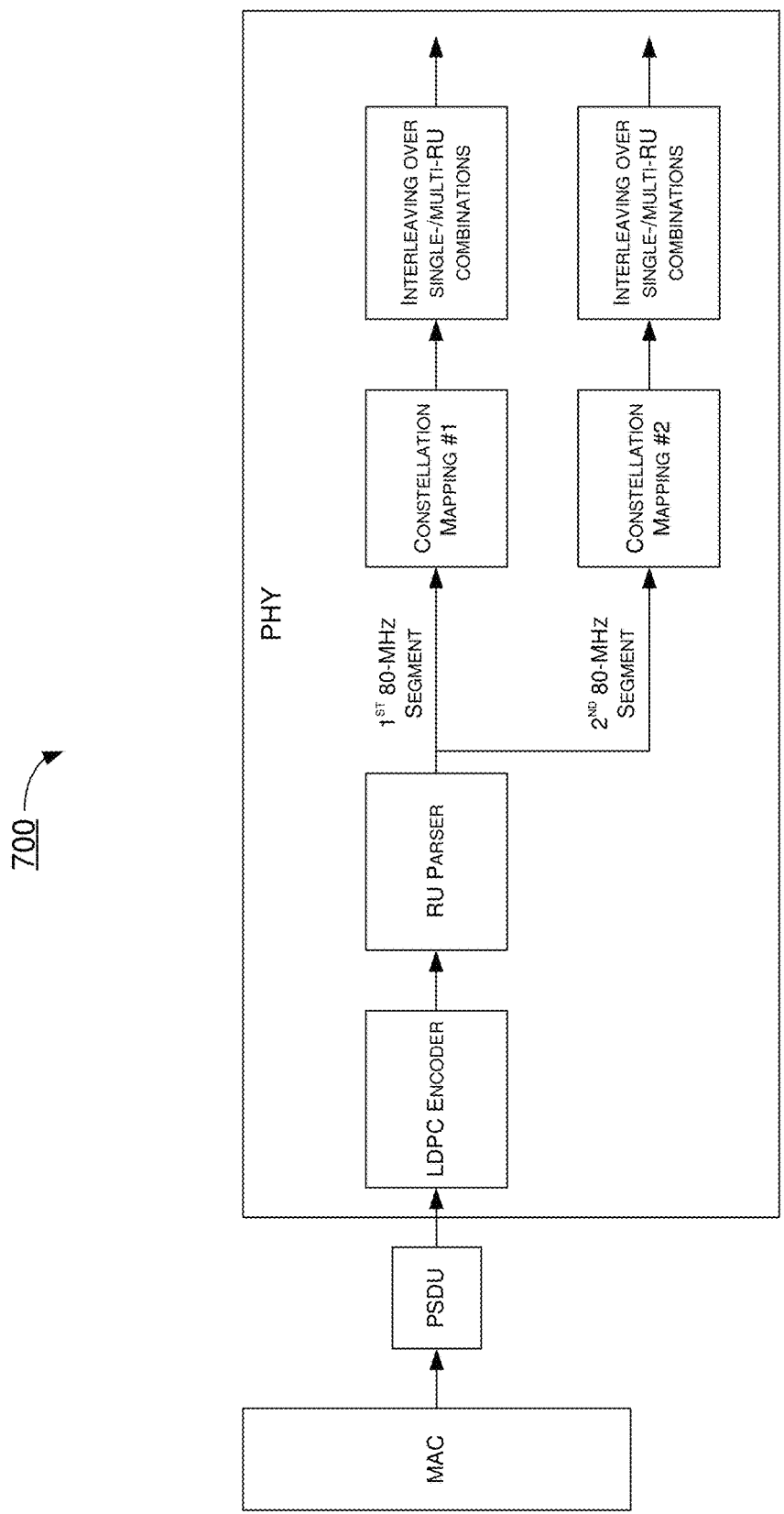
FIG. 7 is a diagram of an example architecture of interleaving for multi-RU combinations in accordance with an implementation of the present disclosure.

FIG. 7 illustrates an example architecture 700 of interleaving for multi-RU combinations in accordance with an implementation of the present disclosure. In architecture 700, for RUs or combined multi-RUs in different 80-MHz frequency segments, different QAM modulations may be used based on CSI and CCA results at the transmitter. In architecture 700, multiple interleavers may be utilized, with each interleaver corresponding to a respective one of the different 80-MHz segments. In the example shown in FIG. 7, two different interleavers may be utilized for RUs or combined multi-RUs over two different 80-MHz frequency segments.

Figure 8:
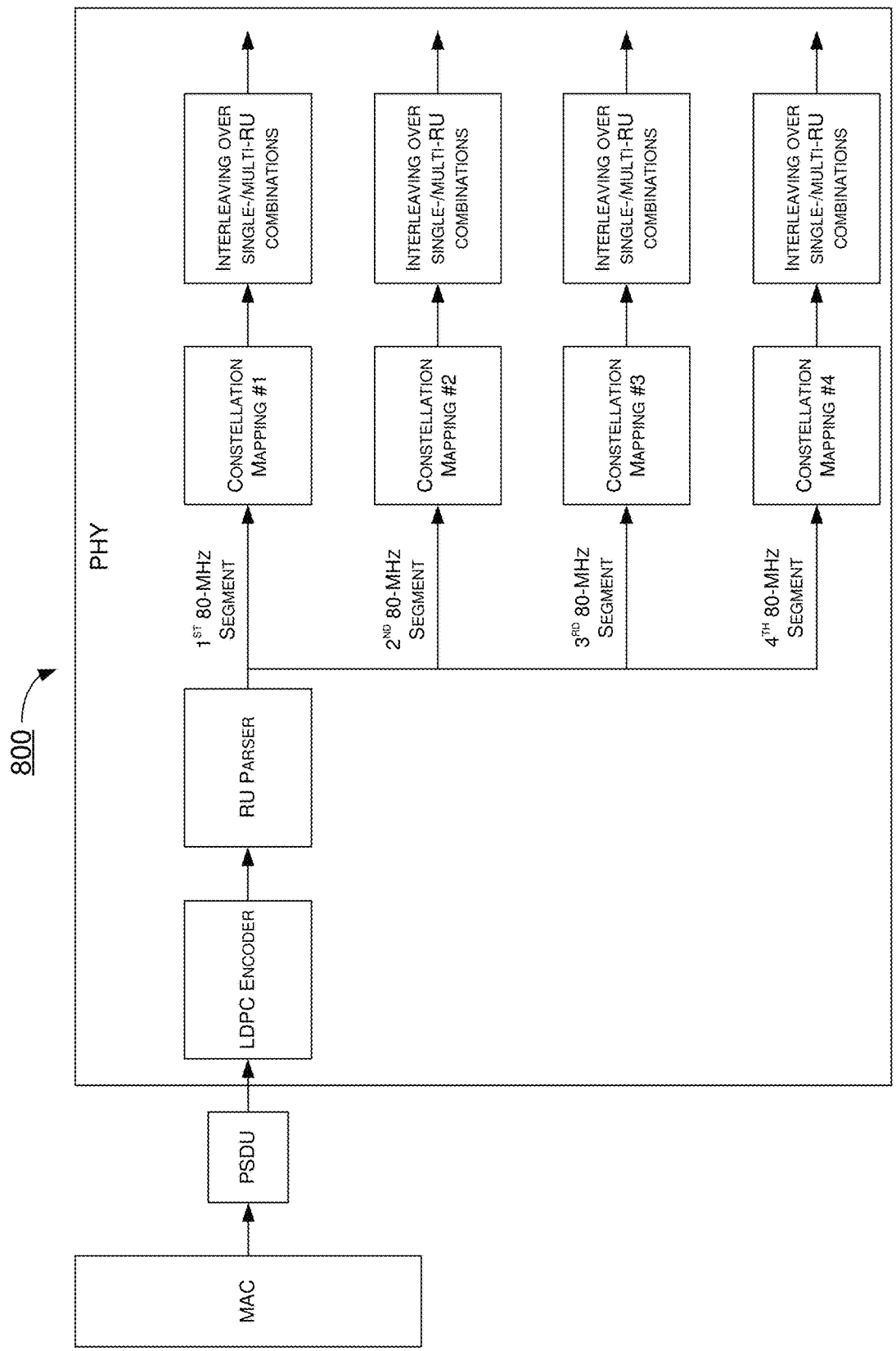
FIG. 8 is a diagram of an example architecture of interleaving for multi-RU combinations in accordance with an implementation of the present disclosure.

FIG. 8 illustrates an example architecture 800 of interleaving for multi-RU combinations in accordance with an implementation of the present disclosure. In architecture 800, for RUs or combined multi-RUs in different 80-MHz frequency segments, different QAM modulations may be used based on CSI and CCA results at the transmitter. In architecture 800, multiple interleavers may be utilized, with each interleaver corresponding to a respective one of the different 80-MHz segments. In the example shown in FIG. 8, four different interleavers may be utilized for RUs or combined multi-RUs over four different 80-MHz frequency segments.

Illustrative Implementations

Figure 9:
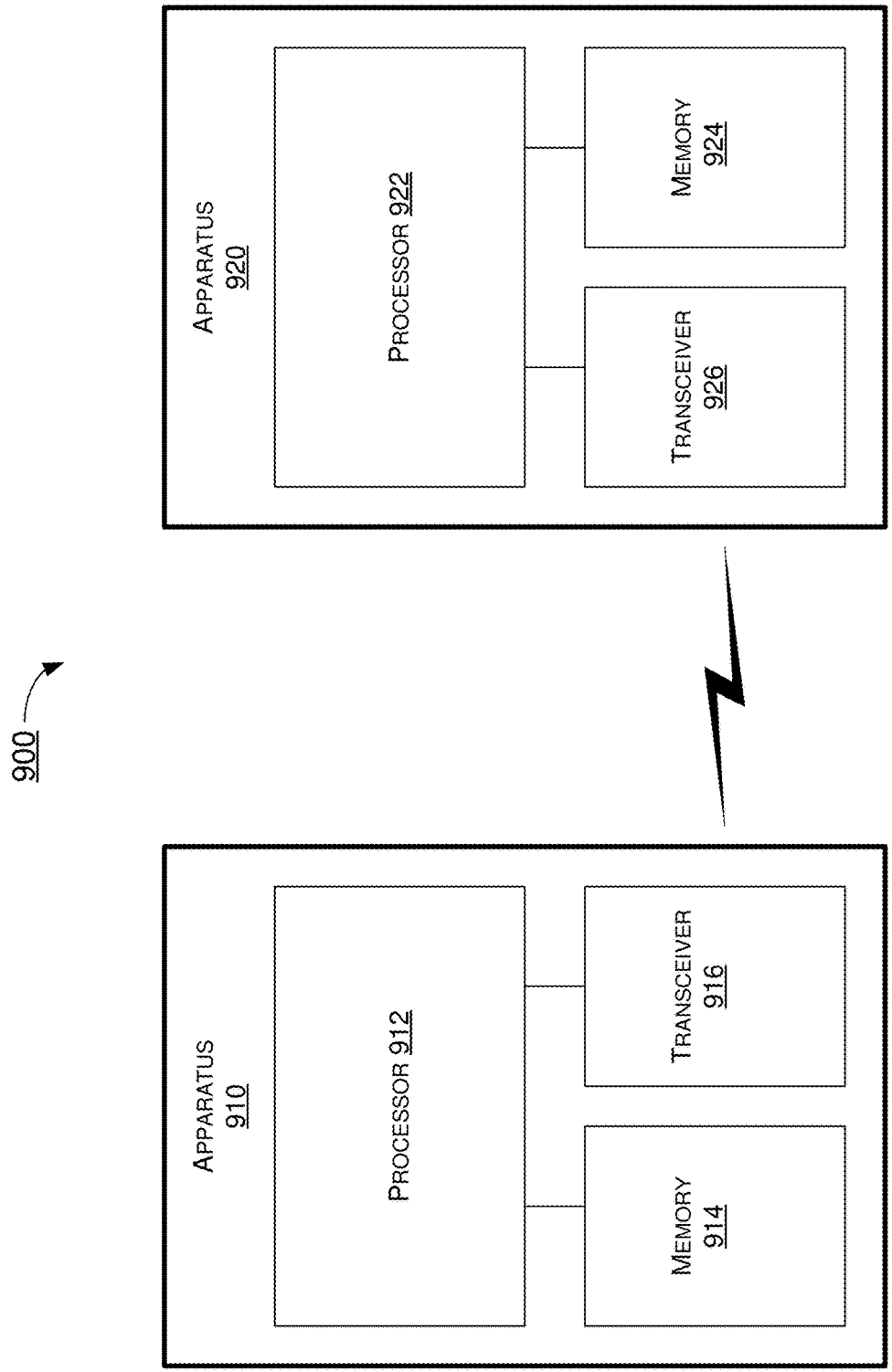
FIG. 9 is a block diagram of an example communication system in accordance with an implementation of the present disclosure.

FIG. 9 illustrates an example system 900 having at least an example apparatus 910 and an example apparatus 920 in accordance with an implementation of the present disclosure. Each of apparatus 910 and apparatus 920 may perform various functions to implement schemes, techniques, processes and methods described herein pertaining to interleaving of combinations of multi-RUs in WLANs, including the various schemes described above with respect to various proposed designs, concepts, schemes, systems and methods described above as well as processes described below. For instance, apparatus 910 may be an example implementation of communication entity 110, and apparatus 920 may be an example implementation of communication entity 120.

Each of apparatus 910 and apparatus 920 may be a part of an electronic apparatus, which may be a STA or an AP, such as a portable or mobile apparatus, a wearable apparatus, a wireless communication apparatus or a computing apparatus. For instance, each of apparatus 910 and apparatus 920 may be implemented in a smartphone, a smart watch, a personal digital assistant, a digital camera, or a computing equipment such as a tablet computer, a laptop computer or a notebook computer. Each of apparatus 910 and apparatus 920 may also be a part of a machine type apparatus, which may be an IoT apparatus such as an immobile or a stationary apparatus, a home apparatus, a wire communication apparatus or a computing apparatus. For instance, each of apparatus 910 and apparatus 920 may be implemented in a smart thermostat, a smart fridge, a smart door lock, a wireless speaker or a home control center. When implemented in or as a network apparatus, apparatus 910 and/or apparatus 920 may be implemented in a network node, such as an AP in a WLAN.

In some implementations, each of apparatus 910 and apparatus 920 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 910 and apparatus 920 may be implemented in or as a STA or an AP. Each of apparatus 910 and apparatus 920 may include at least some of those components shown in FIG. 9 such as a processor 912 and a processor 922, respectively, for example. Each of apparatus 910 and apparatus 920 may further include one or more other components not pertinent to the proposed scheme of the present disclosure (e.g., internal power supply, display device and/or user interface device), and, thus, such component(s) of apparatus 910 and apparatus 920 are neither shown in FIG. 9 nor described below in the interest of simplicity and brevity.

In one aspect, each of processor 912 and processor 922 may be implemented in the form of one or more single-core processors, one or more multi-core processors, one or more RISC processors or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including those pertaining to interleaving of combinations of multi-RUs in WLANs in accordance with various implementations of the present disclosure. For instance, each of processor 912 and processor 922 may be configured with hardware components, or circuitry, implementing one, some or all of example architectures 600, 700 and 800 shown in FIG. 6~FIG. 8.

In some implementations, apparatus 910 may also include a transceiver 916 coupled to processor 912. Transceiver 916 may be capable of wirelessly transmitting and receiving data. In some implementations, apparatus 920 may also include a transceiver 926 coupled to processor 922. Transceiver 926 may include a transceiver capable of wirelessly transmitting and receiving data.

In some implementations, apparatus 910 may further include a memory 914 coupled to processor 912 and capable of being accessed by processor 912 and storing data therein. In some implementations, apparatus 920 may further include a memory 924 coupled to processor 922 and capable of being accessed by processor 922 and storing data therein. Each of memory 914 and memory 924 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 914 and memory 924 may include a type of read-only memory (ROM) such as mask ROM, programmable ROM (PROM), erasable programmable ROM (EPROM) and/or electrically erasable programmable ROM (EEPROM). Alternatively, or additionally, each of memory 914 and memory 924 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 910 and apparatus 920 may be a communication entity capable of communicating with each other using various proposed schemes in accordance with the present disclosure. For illustrative purposes and without limitation, a description of capabilities of apparatus 910, as communication entity 110, and apparatus 920, as communication entity 120, is provided below. It is noteworthy that, although the example implementations described below are provided in the context of WLAN, the same may be implemented in other types of networks. Thus, although the following description of example implementations pertains to a scenario in which apparatus 910 functions as a transmitting device and apparatus 920 functions as a receiving device, the same is also applicable to another scenario in which apparatus 910 functions as a receiving device and apparatus 920 functions as a transmitting device.

Under a proposed scheme in accordance with the present disclosure, processor 912 of apparatus 910 may process data in a service data unit (SDU) (e.g., a PSDU). Additionally, processor 912 may transmit, via transceiver 916, the processed data to a receiving entity (e.g., apparatus 920) over at least some of a plurality of RUs. The processing of the data may involve certain operations. For instance, in processing the data, processor 912 may perform tone mapping by using one joint tone interleaver on one or more combinations of multiple RUs of the plurality of RUs within one frequency segment of a predefined bandwidth. Alternatively, in processing the data, processor 912 may perform tone mapping by using multiple tone interleavers on the one or more combinations of multiple RUs of the plurality of RUs over multiple frequency segments of the predefined bandwidth.

In some implementations, the predefined bandwidth may be 80 MHz.

In some implementations, the one or more combinations of multiple RUs may include a pair of RUs within a 20-MHz frequency segment with the pair of RUs comprising one RU of size 26 and another RU of size 52. In some implementations, the pair of RUs may be adjacent and non-overlapping with respect to each other and separated by one or more unused tones.

In some implementations, the one or more combinations of multiple RUs may include a pair of RUs within a 20-MHz frequency segment with the pair of RUs comprising one RU of size 26 and another RU of size 106. In some implementations, the pair of RUs may be adjacent and non-overlapping with respect to each other and separated by one or more unused tones.

In some implementations, the one or more combinations of multiple RUs may include a combination of a first RU and a second RU within one 80-MHz frequency segment. In some implementations, the first RU may include a RU of size 242 or 484, and the second RU may include a RU of size 242.

In some implementations, the one or more combinations of multiple RUs may include a plurality of groups of one or more RUs over multiple 80-MHz frequency segments with each of the groups being within a respective one of the multiple 80-MHz frequency segments. In some implementations, the plurality of groups of one or more RUs comprise at least a first group of one or more RUs and a second group of one or more RUs. Accordingly, any of the following may be implemented: (a) a scenario in which the first group of one or more RUs comprises a RU of size 484, and the second group of one or more RUs comprises a RU of size 996, (b) a scenario in which the first group of one or more RUs comprises one RU of size 242 and another RU of size 242, and the second group of one or more RUs comprises a RU of size 996, (c) a scenario in which the first group of one or more RUs comprises one RU of size 484 and another RU of size 242, and the second group of one or more RUs comprises one RU of size 484 and another RU of size 242, or (d) a scenario in which the first group of one or more RUs comprises one RU of size 484 and another RU of size 242, and the second group of one or more RUs comprises a RU of size 996. Alternatively, the plurality of groups of one or more RUs may include at least a first group of one or more RUs, a second group of one or more RUs, a third group of one or more RUs and a fourth group of one or more RUs.

Accordingly, any of the following may be implemented: (A) a scenario in which the first group of one or more RUs comprises a RU of size 484, the second group of one or more RUs comprises a RU of size 996, the third group of one or more RUs comprises a RU of size 484, and the fourth group of one or more RUs comprises a RU of size 996, (B) a scenario in which the first group of one or more RUs comprises one RU of size 484 and another RU of size 242, the second group of one or more RUs comprises a RU of size 996, the third group of one or more RUs comprises one RU of size 484 and another RU of size 242, and the fourth group of one or more RUs comprises a RU of size 996, or (C) a scenario in which the first group of one or more RUs comprises one RU of size 484 and another RU of size 242, the second group of one or more RUs comprises one RU of size 484 and another RU of size 242, the third group of one or more RUs comprises one RU of size 484 and another RU of size 242, and the fourth group of one or more RUs comprises one RU of size 484 and another RU of size 242.

In some implementations, in performing tone mapping by using the one joint tone interleaver on the one or more combinations of multiple RUs of the plurality of RUs within one frequency segment, processor 912 may perform the tone mapping by using the one joint tone interleaver on one or more combinations of multiple RUs each of a size less than a size of 242. In some implementations, the one or more combinations of multiple RUs may include a first group of one or more RUs and a second group of one or more RUs. Accordingly, the first group of one or more RUs may include one RU of size 52 and another RU of size 26, and the second group of one or more RUs may include one RU of size 106 and another RU of size 26. Additionally, a first tone mapping distance ($D_{TM}$) corresponding to the first group of one or more RUs may be 3 or 6, and a second $D_{TM}$ corresponding to the second group of one or more RUs may be 6. Moreover, a first tone mapping distance with dual-carrier modulation ($D_{TM\_}D_{CM}$) corresponding to the first group of one or more RUs may be 3, and a second $D_{TM\_}D_{CM}$ corresponding to the second group of one or more RUs may be 3.

In some implementations, in performing tone mapping by using the one joint tone interleaver on the one or more combinations of multiple RUs of the plurality of RUs within one frequency segment, processor 912 may perform the tone mapping by using the one joint tone interleaver on one or more combinations of multiple RUs each of a size greater than or equal to a size of 242. Moreover, the multiple RUs may be within one contiguous 80-MHz frequency segment. In some implementations, the one or more combinations of multiple RUs may include a first group of one or more RUs and a second group of one or more RUs. Accordingly, the first group of one or more RUs may include one RU of size 242 and another RU of size 242, and the second group of one or more RUs may include one RU of size 242 and another RU of size 484. Additionally, a first $D_{TM}$ corresponding to the first group of one or more RUs may be 12, and a second $D_{TM}$ corresponding to the second group of one or more RUs may be 18. Furthermore, a first $D_{TM\_}D_{CM}$ corresponding to the first group of one or more RUs may be 9, and a second $D_{TM\_}D_{CM}$ corresponding to the second group of one or more RUs may be 9.

In some implementations, in performing tone mapping by using the multiple tone interleavers on the one or more combinations of multiple RUs of the plurality of RUs over multiple frequency segments, processor 912 may perform tone mapping by using two separate tone interleavers on the one or more combinations of multiple RUs of the plurality of RUs over two separate 80-MHz frequency segments. In some implementations, the one or more combinations of multiple RUs may include a first group of one or more RUs and a second group of one or more RUs. Accordingly, any of the following may be implemented: (a) a scenario in which the first group of one or more RUs comprises a RU of size 484, and the second group of one or more RUs comprises a RU of size 996, (b) a scenario in which the first group of one or more RUs comprises one RU of size 242 and another RU of size 242, and the second group of one or more RUs comprises a RU of size 996, (c) a scenario in which the first group of one or more RUs comprises one RU of size 484 and another RU of size 242, and the second group of one or more RUs comprises one RU of size 484 and another RU of size 242, or (d) a scenario in which the first group of one or more RUs comprises one RU of size 484 and another RU of size 242, and the second group of one or more RUs comprises a RU of size 996.

Under another proposed scheme in accordance with the present disclosure, processor 912 of apparatus 910 may process data by interleaving the data over at least some of a plurality of RUs. Additionally, processor 912 may transmit, via transceiver 916, the processed data to a receiving entity (e.g., apparatus 920). In interleaving the data, processor 912 may interleave one or more combinations of multiple RUs of the plurality of RUs by using one joint interleaver, in an event that a size of each RU of the multiple RUs is less than a predefined size. Alternatively, in interleaving the data, processor 912 may interleave the one or more combinations of the multiple RUs of the plurality of RUs by using the one joint interleaver, in an even that a size of each RU of the multiple RUs is greater than or equal to the predefined size, responsive to the multiple RUs being within one contiguous frequency segment of a predefined bandwidth. Still alternatively, in interleaving the data, processor 912 may interleave the one or more combinations of the multiple RUs of the plurality of RUs by using multiple tone interleavers responsive to the multiple RUs being over multiple frequency segments of the predefined bandwidth. In some implementations, the predefined size may be 242, and the predefined bandwidth may be 80 MHz.

In some implementations, in interleaving the one or more combinations of the multiple RUs of the plurality of RUs by using the one joint interleaver, processor 912 may interleave a pair of RUs within a 20-MHz frequency segment by using the one joint interleaver with the pair of RUs comprising one RU of size 26 and another RU of size 52 or 106. In some implementations, the pair of RUs may be adjacent and non-overlapping with respect to each other and separated by one or more unused tones.

In some implementations, in interleaving the one or more combinations of the multiple RUs of the plurality of RUs by using the one joint interleaver, processor 912 may interleave a combination of a first RU and a second RU within one 80-MHz frequency segment by using the one joint interleaver. In some implementations, the first RU may include a RU of size 242 or 484, and the second RU may include a RU of size 242.

In some implementations, in interleaving the one or more combinations of the multiple RUs of the plurality of RUs by using the one joint interleaver, processor 912 may interleave a plurality of groups of one or more RUs over multiple 80-MHz frequency segments by using the one joint interleaver, with each of the groups being within a respective one of the multiple 80-MHz frequency segments. In some implementations, in an event that the plurality of groups of one or more RUs comprise at least two groups of one or more RUs, any of the following may be implemented: (a) a scenario in which a first group of one or more RUs comprises a RU of size 484, and a second group of one or more RUs comprises a RU of size 996, (b) a scenario in which the first group of one or more RUs comprises one RU of size 242 and another RU of size 242, and the second group of one or more RUs comprises a RU of size 996, (c) a scenario in which the first group of one or more RUs comprises one RU of size 484 and another RU of size 242, and the second group of one or more RUs comprises one RU of size 484 and another RU of size 242, or (d) the first group of one or more RUs comprises one RU of size 484 and another RU of size 242, and the second group of one or more RUs comprises a RU of size 996. Alternatively, in an event that the plurality of groups of one or more RUs comprise at least four groups of one or more RUs, any of the following may be implemented: (A) a scenario in which a first group of one or more RUs comprises a RU of size 484, a second group of one or more RUs comprises a RU of size 996, a third group of one or more RUs comprises a RU of size 484, and a fourth group of one or more RUs comprises a RU of size 996, (B) a scenario in which the first group of one or more RUs comprises one RU of size 484 and another RU of size 242, the second group of one or more RUs comprises a RU of size 996, the third group of one or more RUs comprises one RU of size 484 and another RU of size 242, and the fourth group of one or more RUs comprises a RU of size 996, or (C) a scenario in which the first group of one or more RUs comprises one RU of size 484 and another RU of size 242, the second group of one or more RUs comprises one RU of size 484 and another RU of size 242, the third group of one or more RUs comprises one RU of size 484 and another RU of size 242, and the fourth group of one or more RUs comprises one RU of size 484 and another RU of size 242.

In some implementations, in interleaving the one or more combinations of the multiple RUs of the plurality of RUs by using the one joint interleaver, processor 912 may interleave a first group of one or more RUs and a second group of one or more RUs of the plurality of RUs by using the one joint interleaver. In some implementations, in an event that the size of each RU of the multiple RUs is less than the predefined size, the first group of one or more RUs may include one RU of size 52 and another RU of size 26, and the second group of one or more RUs may include one RU of size 106 and another RU of size 26. Additionally, a first $D_{TM}$ corresponding to the first group of one or more RUs may be 3 or 6, and a second $D_{TM}$ corresponding to the second group of one or more RUs may be 6. Furthermore, a first $D_{TM\_DCM}$ corresponding to the first group of one or more RUs may be 3, and a second $D_{TM\_DCM}$ corresponding to the second group of one or more RUs may be 3. Alternatively, in an event that the size of each RU of the multiple RUs is greater than or equal to the predefined size and the multiple RUs are within one contiguous frequency segment of the predefined bandwidth, the first group of one or more RUs may include one RU of size 242 and another RU of size 242, and the second group of one or more RUs may include one RU of size 242 and another RU of size 484. Moreover, a first $D_{TM}$ corresponding to the first group of one or more RUs may be 12, and a second $D_{TM}$ corresponding to the second group of one or more RUs may be 18. Furthermore, a first $D_{TM\_DCM}$ corresponding to the first group of one or more RUs may be 9, and a second $D_{TM\_DCM}$ corresponding to the second group of one or more RUs may be 9.

In some implementations, in interleaving the one or more combinations of the multiple RUs of the plurality of RUs by using multiple tone interleavers, processor 912 may interleave by using two separate tone interleavers on the one or more combinations of multiple RUs of the plurality of RUs over two separate 80-MHz frequency segments. In some implementations, the one or more combinations of multiple RUs may include a first group of one or more RUs and a second group of one or more RUs. Accordingly, any of the following may be implemented: (a) a scenario in which the first group of one or more RUs comprises a RU of size 484, and the second group of one or more RUs comprises a RU of size 996, (b) a scenario in which the first group of one or more RUs comprises one RU of size 242 and another RU of size 242, and the second group of one or more RUs comprises a RU of size 996, (c) a scenario in which the first group of one or more RUs comprises one RU of size 484 and another RU of size 242, and the second group of one or more RUs comprises one RU of size 484 and another RU of size 242, or (d) a scenario in which the first group of one or more RUs comprises one RU of size 484 and another RU of size 242, and the second group of one or more RUs comprises a RU of size 996.

Illustrative Processes

Figure 10:
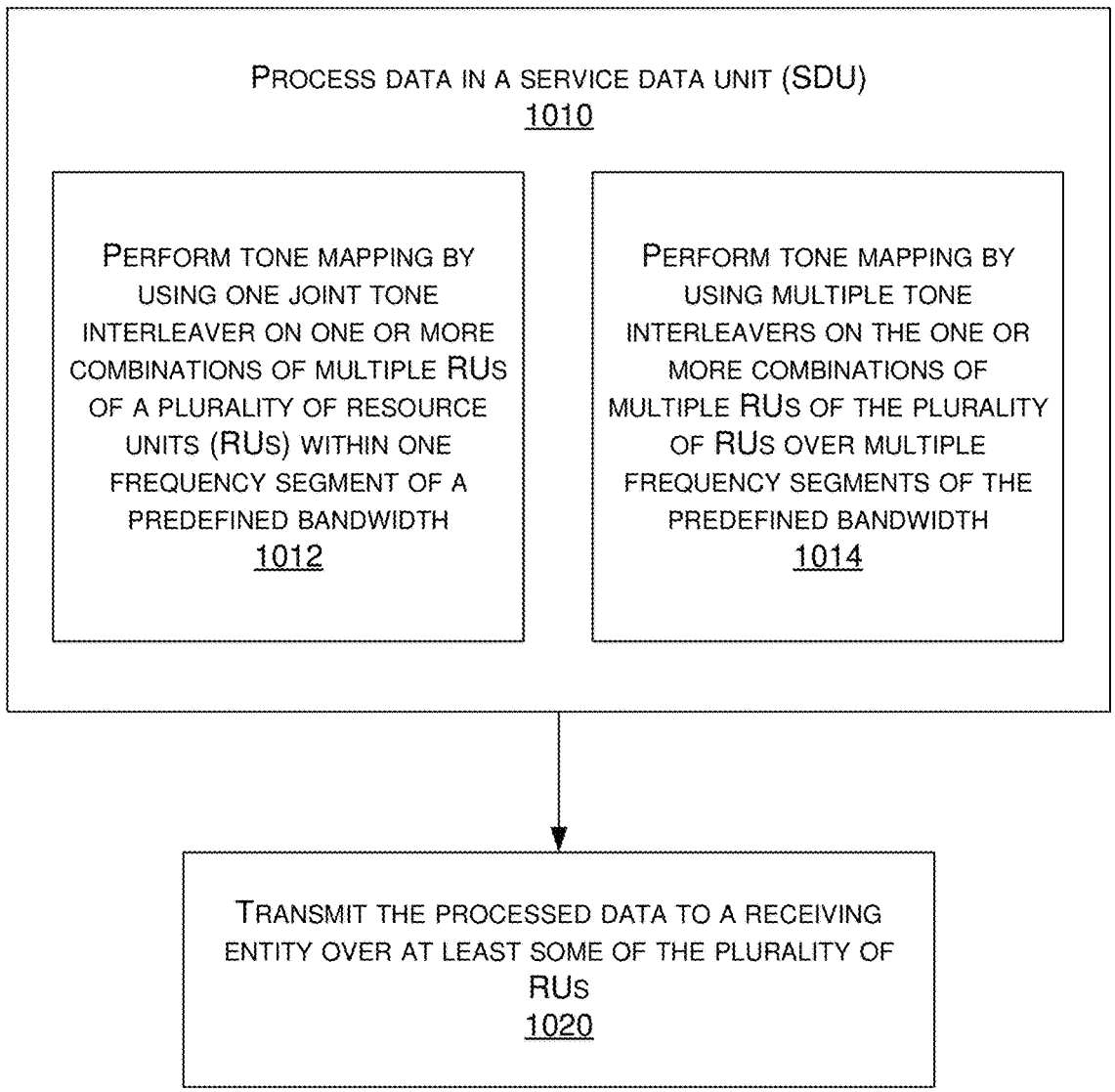
FIG. 10 is a flowchart of an example process in accordance with an implementation of the present disclosure.

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to interleaving of combinations of multi-RUs in WLANs in accordance with the present disclosure. Process 1000 may include one or more operations, actions, or functions as illustrated by one or more of blocks 1010 and 1020 as well as sub-blocks 1012 and 1014. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in apparatus 910 and apparatus 920 as well as any variations thereof. Solely for illustrative purposes and without limiting the scope, process 1000 is described below in the context of apparatus 910 as communication entity 110 (e.g., a transmitting device whether a STA or an AP) and apparatus 920 as communication entity 120 (e.g., a receiving device whether a STA or an AP) of a wireless network such as a WLAN in accordance with one or more of IEEE 802.11 standards. Process 1000 may begin at block 1010.

At 1010, process 1000 may involve processor 912 of apparatus 910 processing data in a SDU (e.g., a PSDU). The processing of the data may involve alternative operations represented by sub-blocks 1012 and 1014. Process 1000 may proceed from 1010 to 1020.

At 1020, process 1000 may involve processor 912 transmitting, via transceiver 916, the processed data to a receiving entity (e.g., apparatus 920) over at least some of a plurality of RUs.

At 1012, process 1000 may involve processor 912 performing tone mapping by using one joint tone interleaver on one or more combinations of multiple RUs of the plurality of RUs within one frequency segment of a predefined bandwidth.

At 1014, process 1000 may involve processor 912 performing tone mapping by using multiple tone interleavers on the one or more combinations of multiple RUs of the plurality of RUs over multiple frequency segments of the predefined bandwidth.

In some implementations, the predefined bandwidth may be 80 MHz.

In some implementations, the one or more combinations of multiple RUs may include a pair of RUs within a 20-MHz frequency segment with the pair of RUs comprising one RU of size 26 and another RU of size 52. In some implementations, the pair of RUs may be adjacent and non-overlapping with respect to each other and separated by one or more unused tones.

In some implementations, the one or more combinations of multiple RUs may include a pair of RUs within a 20-MHz frequency segment with the pair of RUs comprising one RU of size 26 and another RU of size 106. In some implementations, the pair of RUs may be adjacent and non-overlapping with respect to each other and separated by one or more unused tones.

In some implementations, the one or more combinations of multiple RUs may include a combination of a first RU and a second RU within one 80-MHz frequency segment. In some implementations, the first RU may include a RU of size 242 or 484, and the second RU may include a RU of size 242.

In some implementations, the one or more combinations of multiple RUs may include a plurality of groups of one or more RUs over multiple 80-MHz frequency segments with each of the groups being within a respective one of the multiple 80-MHz frequency segments. In some implementations, the plurality of groups of one or more RUs comprise at least a first group of one or more RUs and a second group of one or more RUs. Accordingly, any of the following may be implemented: (a) a scenario in which the first group of one or more RUs comprises a RU of size 484, and the second group of one or more RUs comprises a RU of size 996, (b) a scenario in which the first group of one or more RUs comprises one RU of size 242 and another RU of size 242, and the second group of one or more RUs comprises a RU of size 996, (c) a scenario in which the first group of one or more RUs comprises one RU of size 484 and another RU of size 242, and the second group of one or more RUs comprises one RU of size 484 and another RU of size 242, or (d) a scenario in which the first group of one or more RUs comprises one RU of size 484 and another RU of size 242, and the second group of one or more RUs comprises a RU of size 996. Alternatively, the plurality of groups of one or more RUs may include at least a first group of one or more RUs, a second group of one or more RUs, a third group of one or more RUs and a fourth group of one or more RUs. Accordingly, any of the following may be implemented: (A) a scenario in which the first group of one or more RUs comprises a RU of size 484, the second group of one or more RUs comprises a RU of size 996, the third group of one or more RUs comprises a RU of size 484, and the fourth group of one or more RUs comprises a RU of size 996, (B) a scenario in which the first group of one or more RUs comprises one RU of size 484 and another RU of size 242, the second group of one or more RUs comprises a RU of size 996, the third group of one or more RUs comprises one RU of size 484 and another RU of size 242, and the fourth group of one or more RUs comprises a RU of size 996, or (C) a scenario in which the first group of one or more RUs comprises one RU of size 484 and another RU of size 242, the second group of one or more RUs comprises one RU of size 484 and another RU of size 242, the third group of one or more RUs comprises one RU of size 484 and another RU of size 242, and the fourth group of one or more RUs comprises one RU of size 484 and another RU of size 242.

In some implementations, in performing tone mapping by using the one joint tone interleaver on the one or more combinations of multiple RUs of the plurality of RUs within one frequency segment, process 1000 may involve processor 912 performing the tone mapping by using the one joint tone interleaver on one or more combinations of multiple RUs each of a size less than a size of 242. In some implementations, the one or more combinations of multiple RUs may include a first group of one or more RUs and a second group of one or more RUs. Accordingly, the first group of one or more RUs may include one RU of size 52 and another RU of size 26, and the second group of one or more RUs may include one RU of size 106 and another RU of size 26. Additionally, a first tone mapping distance ($D_{TM}$) corresponding to the first group of one or more RUs may be 3 or 6, and a second $D_{TM}$ corresponding to the second group of one or more RUs may be 6. Moreover, a first tone mapping distance with dual-carrier modulation ($D_{TM\_DCM}$) corresponding to the first group of one or more RUs may be 3, and a second $D_{TM\_DCM}$ corresponding to the second group of one or more RUs may be 3.

In some implementations, in performing tone mapping by using the one joint tone interleaver on the one or more combinations of multiple RUs of the plurality of RUs within one frequency segment, process 1000 may involve processor 912 performing the tone mapping by using the one joint tone interleaver on one or more combinations of multiple RUs each of a size greater than or equal to a size of 242. Moreover, the multiple RUs may be within one contiguous 80-MHz frequency segment. In some implementations, the one or more combinations of multiple RUs may include a first group of one or more RUs and a second group of one or more RUs. Accordingly, the first group of one or more RUs may include one RU of size 242 and another RU of size 242, and the second group of one or more RUs may include one RU of size 242 and another RU of size 484. Additionally, a first $D_{TM}$ corresponding to the first group of one or more RUs may be 12, and a second $D_{TM}$ corresponding to the second group of one or more RUs may be 18. Furthermore, a first $D_{TM\_DCM}$ corresponding to the first group of one or more RUs may be 9, and a second $D_{TM\_DCM}$ corresponding to the second group of one or more RUs may be 9.

In some implementations, in performing tone mapping by using the multiple tone interleavers on the one or more combinations of multiple RUs of the plurality of RUs over multiple frequency segments, process 1000 may involve processor 912 performing tone mapping by using two separate tone interleavers on the one or more combinations of multiple RUs of the plurality of RUs over two separate 80-MHz frequency segments. In some implementations, the one or more combinations of multiple RUs may include a first group of one or more RUs and a second group of one or more RUs. Accordingly, any of the following may be implemented: (a) a scenario in which the first group of one or more RUs comprises a RU of size 484, and the second group of one or more RUs comprises a RU of size 996, (b) a scenario in which the first group of one or more RUs comprises one RU of size 242 and another RU of size 242, and the second group of one or more RUs comprises a RU of size 996, (c) a scenario in which the first group of one or more RUs comprises one RU of size 484 and another RU of size 242, and the second group of one or more RUs comprises one RU of size 484 and another RU of size 242, or (d) a scenario in which the first group of one or more RUs comprises one RU of size 484 and another RU of size 242, and the second group of one or more RUs comprises a RU of size 996.

FIG. 11 illustrates an example process 1100 in accordance with an implementation of the present disclosure. Process 1100 may represent an aspect of implementing various proposed designs, concepts, schemes, systems and methods described above. More specifically, process 1100 may represent an aspect of the proposed concepts and schemes pertaining to interleaving of combinations of multi-RUs in WLANs in accordance with the present disclosure. Process 1100 may include one or more operations, actions, or functions as illustrated by one or more of blocks 1110 and 1120 as well as sub-blocks 1112, 1114 and 1116. Although illustrated as discrete blocks, various blocks of process 1100 may be divided into additional blocks, combined into fewer blocks, or eliminated, depending on the desired implementation. Moreover, the blocks/sub-blocks of process 1100 may be executed in the order shown in FIG. 11 or, alternatively in a different order. Furthermore, one or more of the blocks/sub-blocks of process 1100 may be executed repeatedly or iteratively. Process 1100 may be implemented by or in apparatus 910 and apparatus 920 as well as any variations thereof. Solely for illustrative purposes and without limiting the scope, process 1100 is described below in the context of apparatus 910 as communication entity 110 (e.g., a transmitting device whether a STA or an AP) and apparatus 920 as communication entity 120 (e.g., a receiving device whether a STA or an AP) of a wireless network such as a WLAN in accordance with one or more of IEEE 802.11 standards. Process 1100 may begin at block 1110.

At 1110, process 1100 may involve processor 912 of apparatus 910 processing data by interleaving the data over at least some of a plurality of RUs by performing alternative operations as represented by sub-blocks 1112, 1114 and 1116. Process 1100 may proceed from 1110 to 1120.

At 1120, process 1100 may involve processor 912 transmitting, via transceiver 916, the processed data to a receiving entity (e.g., apparatus 920).

At 1112, process 1100 may involve processor 912 interleaving one or more combinations of multiple RUs of the plurality of RUs by using one joint interleaver, in an event that a size of each RU of the multiple RUs is less than a predefined size.

At 1114, process 1100 may involve processor 912 interleaving the one or more combinations of the multiple RUs of the plurality of RUs by using the one joint interleaver, in an even that a size of each RU of the multiple RUs is greater than or equal to the predefined size, responsive to the multiple RUs being within one contiguous frequency segment of a predefined bandwidth.

At 1116, process 1100 may involve processor 912 interleaving the one or more combinations of the multiple RUs of the plurality of RUs by using multiple tone interleavers responsive to the multiple RUs being over multiple frequency segments of the predefined bandwidth.

In some implementations, the predefined size may be 242, and the predefined bandwidth may be 80 MHz.

In some implementations, in interleaving the one or more combinations of the multiple RUs of the plurality of RUs by using the one joint interleaver, process 1100 may involve processor 912 interleaving a pair of RUs within a 20-MHz frequency segment by using the one joint interleaver with the pair of RUs comprising one RU of size 26 and another RU of size 52 or 106. In some implementations, the pair of RUs may be adjacent and non-overlapping with respect to each other and separated by one or more unused tones.

In some implementations, in interleaving the one or more combinations of the multiple RUs of the plurality of RUs by using the one joint interleaver, process 1100 may involve processor 912 interleaving a combination of a first RU and a second RU within one 80-MHz frequency segment by using the one joint interleaver. In some implementations, the first RU may include a RU of size 242 or 484, and the second RU may include a RU of size 242.

In some implementations, in interleaving the one or more combinations of the multiple RUs of the plurality of RUs by using the one joint interleaver, process 1100 may involve processor 912 interleaving a plurality of groups of one or more RUs over multiple 80-MHz frequency segments by using the one joint interleaver, with each of the groups being within a respective one of the multiple 80-MHz frequency segments. In some implementations, in an event that the plurality of groups of one or more RUs comprise at least two groups of one or more RUs, any of the following may be implemented: (a) a scenario in which a first group of one or more RUs comprises a RU of size 484, and a second group of one or more RUs comprises a RU of size 996, (b) a scenario in which the first group of one or more RUs comprises one RU of size 242 and another RU of size 242, and the second group of one or more RUs comprises a RU of size 996, (c) a scenario in which the first group of one or more RUs comprises one RU of size 484 and another RU of size 242, and the second group of one or more RUs comprises one RU of size 484 and another RU of size 242, or (d) the first group of one or more RUs comprises one RU of size 484 and another RU of size 242, and the second group of one or more RUs comprises a RU of size 996. Alternatively, in an event that the plurality of groups of one or more RUs comprise at least four groups of one or more RUs, any of the following may be implemented: (A) a scenario in which a first group of one or more RUs comprises a RU of size 484, a second group of one or more RUs comprises a RU of size 996, a third group of one or more RUs comprises a RU of size 484, and a fourth group of one or more RUs comprises a RU of size 996, (B) a scenario in which the first group of one or more RUs comprises one RU of size 484 and another RU of size 242, the second group of one or more RUs comprises a RU of size 996, the third group of one or more RUs comprises one RU of size 484 and another RU of size 242, and the fourth group of one or more RUs comprises a RU of size 996, or (C) a scenario in which the first group of one or more RUs comprises one RU of size 484 and another RU of size 242, the second group of one or more RUs comprises one RU of size 484 and another RU of size 242, the third group of one or more RUs comprises one RU of size 484 and another RU of size 242, and the fourth group of one or more RUs comprises one RU of size 484 and another RU of size 242.

In some implementations, in interleaving the one or more combinations of the multiple RUs of the plurality of RUs by using the one joint interleaver, process 1100 may involve processor 912 interleaving a first group of one or more RUs and a second group of one or more RUs of the plurality of RUs by using the one joint interleaver. In some implementations, in an event that the size of each RU of the multiple RUs is less than the predefined size, the first group of one or more RUs may include one RU of size 52 and another RU of size 26, and the second group of one or more RUs may include one RU of size 106 and another RU of size 26.

Additionally, a first $D_{TM}$ corresponding to the first group of one or more RUs may be 3 or 6, and a second $D_{TM}$ corresponding to the second group of one or more RUs may be 6. Furthermore, a first $D_{TM\_}D_{CM}$ corresponding to the first group of one or more RUs may be 3, and a second $D_{TM\_}D_{CM}$ corresponding to the second group of one or more RUs may be 3. Alternatively, in an event that the size of each RU of the multiple RUs is greater than or equal to the predefined size and the multiple RUs are within one contiguous frequency segment of the predefined bandwidth, the first group of one or more RUs may include one RU of size 242 and another RU of size 242, and the second group of one or more RUs may include one RU of size 242 and another RU of size 484. Moreover, a first $D_{TM}$ corresponding to the first group of one or more RUs may be 12, and a second $D_{TM}$ corresponding to the second group of one or more RUs may be 18. Furthermore, a first $D_{TM\_}D_{CM}$ corresponding to the first group of one or more RUs may be 9, and a second $D_{TM\_}D_{CM}$ corresponding to the second group of one or more RUs may be 9.

In some implementations, in interleaving the one or more combinations of the multiple RUs of the plurality of RUs by using multiple tone interleavers, process 1100 may involve processor 912 interleaving by using two separate tone interleavers on the one or more combinations of multiple RUs of the plurality of RUs over two separate 80-MHz frequency segments. In some implementations, the one or more combinations of multiple RUs may include a first group of one or more RUs and a second group of one or more RUs. Accordingly, any of the following may be implemented: (a) a scenario in which the first group of one or more RUs comprises a RU of size 484, and the second group of one or more RUs comprises a RU of size 996, (b) a scenario in which the first group of one or more RUs comprises one RU of size 242 and another RU of size 242, and the second group of one or more RUs comprises a RU of size 996, (c) a scenario in which the first group of one or more RUs comprises one RU of size 484 and another RU of size 242, and the second group of one or more RUs comprises one RU of size 484 and another RU of size 242, or (d) a scenario in which the first group of one or more RUs comprises one RU of size 484 and another RU of size 242, and the second group of one or more RUs comprises a RU of size 996.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. An apparatus, comprising:
a transceiver configured to communicate wirelessly; and
a processor coupled to the transceiver and configured to perform operations comprising:
processing data in a service data unit (SDU); and
transmitting the processed data to a receiving entity over at least some of a plurality of resource units (RUs), wherein the processing of the data comprises:
performing tone mapping by using one joint tone interleaver of the processor on one or more combinations of multiple RUs of the plurality of RUs within at least one frequency segment of a predefined bandwidth; or
performing tone mapping by using multiple tone interleavers of the processor on the one or more combinations of multiple RUs of the plurality of RUs over one or multiple frequency segments of the predefined bandwidth,
wherein, in an event that the plurality of RUs comprise a first group of one or more RUs and a second group of one or more RUs within an 80 MHz frequency segment, with the first group of one or more RUs comprising one RU of size 52 and another RU of size 26 and with the second group of one or more RUs comprising one RU of size 106 and another RU of size 26, the processor is configured to perform the tone mapping such that a tone mapping distance ($D_{TM}$) corresponding to the second group of one or more RUs is 6.

2. The apparatus of claim 1, wherein the predefined bandwidth is 80 MHz.

3. The apparatus of claim 1, wherein the one or more combinations of multiple RUs comprise a pair of RUs within a 20-MHz frequency segment with the pair of RUs comprising the RU of size 26 and another RU of size 52, and wherein the pair of RUs are adjacent and non-overlapping with respect to each other and separated by one or more unused tones.

4. The apparatus of claim 1, wherein the one or more combinations of multiple RUs comprise a pair of RUs within a 20-MHz frequency segment with the pair of RUs comprising the RU of size 26 and the RU of size 106, and wherein the pair of RUs are adjacent and non-overlapping with respect to each other and separated by one or more unused tones.

5. The apparatus of claim 1, wherein the one or more combinations of multiple RUs comprise a combination of a first RU and a second RU within the 80-MHz frequency segment, wherein the first RU comprises a RU of size 242 or 484, and wherein the second RU comprises a RU of size 242.

6. The apparatus of claim 1, wherein the one or more combinations of multiple RUs comprise a plurality of groups of one or more RUs over multiple 80-MHz frequency segments with each of the groups being within a respective one of the multiple 80-MHz frequency segments.

7. The apparatus of claim 6, wherein the plurality of groups of one or more RUs comprise at least the first group of one or more RUs and the second group of one or more RUs, and wherein:
the first group of one or more RUs comprises a RU of size 484, and the second group of one or more RUs comprises a RU of size 996,
the first group of one or more RUs comprises one RU of size 242 and another RU of size 242, and the second group of one or more RUs comprises a RU of size 996,
the first group of one or more RUs comprises one RU of size 484 and another RU of size 242, and the second group of one or more RUs comprises one RU of size 484 and another RU of size 242, or
the first group of one or more RUs comprises one RU of size 484 and another RU of size 242, and the second group of one or more RUs comprises a RU of size 996.

8. The apparatus of claim 6, wherein the plurality of groups of one or more RUs comprise at least the first group of one or more RUs, the second group of one or more RUs, a third group of one or more RUs and a fourth group of one or more RUs, and wherein:
the first group of one or more RUs comprises a RU of size 484, the second group of one or more RUs comprises a RU of size 996, the third group of one or more RUs comprises a RU of size 484, and the fourth group of one or more RUs comprises a RU of size 996,
the first group of one or more RUs comprises one RU of size 484 and another RU of size 242, the second group of one or more RUs comprises a RU of size 996, the third group of one or more RUs comprises one RU of size 484 and another RU of size 242, and the fourth group of one or more RUs comprises a RU of size 996, or
the first group of one or more RUs comprises one RU of size 484 and another RU of size 242, the second group of one or more RUs comprises one RU of size 484 and another RU of size 242, the third group of one or more RUs comprises one RU of size 484 and another RU of size 242, and the fourth group of one or more RUs comprises one RU of size 484 and another RU of size 242.

9. The apparatus of claim 1, in performing the tone mapping by using the one joint tone interleaver on the one or more combinations of multiple RUs of the plurality of RUs within one frequency segment, the processor is configured to perform the tone mapping by using the one joint tone interleaver on one or more combinations of multiple RUs each of a size less than a size of 242.

10. The apparatus of claim 9, wherein:
another $D_{TM}$ corresponding to the first group of one or more RUs is 4 or 6, and
a first tone mapping distance with dual-carrier modulation ($D_{TM}$-$D_{CM}$) corresponding to the first group of one or more RUs is 3, and a second $D_{TM}$-$D_{CM}$ corresponding to the second group of one or more RUs is 3.

11. The apparatus of claim 1, wherein, in performing the tone mapping by using the one joint tone interleaver on the one or more combinations of multiple RUs of the plurality of RUs within one frequency segment, the processor is configured to perform the tone mapping by using the one joint tone interleaver on one or more combinations of multiple RUs each of a size greater than or equal to a size of 242, and wherein the multiple RUs are within one contiguous 80-MHz frequency segment.

12. The apparatus of claim 11, wherein the one or more combinations of multiple RUs comprise the first group of one or more RUs and the second group of one or more RUs, and wherein:
the first group of one or more RUs comprises one RU of size 242 and another RU of size 242, and the second group of one or more RUs comprises one RU of size 242 and another RU of size 484, a first tone mapping distance ($D_{TM}$) corresponding to the first group of one or more RUs is 12, and a second $D_{TM}$ corresponding to the second group of one or more RUs is 18, and a first tone mapping distance with dual-carrier modulation ($D_{TM\_DCM}$) corresponding to the first group of one or more RUs is 9, and a second $D_{TM\_DCM}$ corresponding to the second group of one or more RUs is 9.

13. The apparatus of claim 1, wherein, in performing the tone mapping by using the multiple tone interleavers on the one or more combinations of multiple RUs of the plurality of RUs over the one or multiple frequency segments, the processor is configured to perform the tone mapping by using two separate tone interleavers on the one or more combinations of multiple RUs of the plurality of RUs over two separate 80-MHz frequency segments.

14. The apparatus of claim 13, wherein the one or more combinations of multiple RUs comprise the first group of one or more RUs and the second group of one or more RUs, and wherein:
   the first group of one or more RUs comprises a RU of size 484, and the second group of one or more RUs comprises a RU of size 996,
   the first group of one or more RUs comprises one RU of size 242 and another RU of size 242, and the second group of one or more RUs comprises a RU of size 996,
   the first group of one or more RUs comprises one RU of size 484 and another RU of size 242, and the second group of one or more RUs comprises one RU of size 484 and another RU of size 242, or
   the first group of one or more RUs comprises one RU of size 484 and another RU of size 242, and the second group of one or more RUs comprises a RU of size 996.

15. An apparatus, comprising:
   a transceiver configured to communicate wirelessly; and
   a processor coupled to the transceiver and configured to process data by interleaving the data over at least some of a plurality of resource units (RUs) by:
      interleaving one or more combinations of multiple RUs of the plurality of RUs by using one joint interleaver of the processor, in an event that a size of each RU of the multiple RUs is less than a predefined size; or
      interleaving the one or more combinations of the multiple RUs of the plurality of RUs by using the one joint interleaver, in an even that a size of each RU of the multiple RUs is greater than or equal to the predefined size, responsive to the multiple RUs being within one contiguous frequency segment of a predefined bandwidth; or
      interleaving the one or more combinations of the multiple RUs of the plurality of RUs by using multiple tone interleavers of the processor responsive to the multiple RUs being over one or multiple frequency segments of the predefined bandwidth; and
   transmitting the processed data to a receiving entity,
   wherein, in an event that the plurality of RUs comprise a first group of one or more RUs and a second group of one or more RUs within an 80 MHz frequency segment, with the first group of one or more RUs comprising one RU of size 52 and another RU of size 26 and with the second group of one or more RUs comprising one RU of size 106 and another RU of size 26, the processor is configured to perform the tone mapping such that a tone mapping distance ($D_{TM}$) corresponding to the second group of one or more RUs is 6.

16. The apparatus of claim 15, wherein, in interleaving the one or more combinations of the multiple RUs of the plurality of RUs by using the one joint interleaver, the processor is configured to interleave a pair of RUs within a 20-MHz frequency segment by using the one joint interleaver with the pair of RUs comprising the RU of size 26 and another RU of size 52 or 106, and wherein the pair of RUs are adjacent and non-overlapping with respect to each other and separated by one or more unused tones.

17. The apparatus of claim 15, wherein, in interleaving the one or more combinations of the multiple RUs of the plurality of RUs by using the one joint interleaver, the processor is configured to interleave a combination of a first RU and a second RU within the 80-MHz frequency segment by using the one joint interleaver, wherein the first RU comprises a RU of size 242 or 484, and wherein the second RU comprises a RU of size 242.

18. The apparatus of claim 15, wherein, in interleaving the one or more combinations of the multiple RUs of the plurality of RUs by using the one joint interleaver, the processor is configured to interleave a plurality of groups of one or more RUs over multiple 80-MHz frequency segments by using the one joint interleaver, with each of the groups being within a respective one of the multiple 80-MHz frequency segments,
   wherein, in an event that the plurality of groups of one or more RUs comprise at least two groups of one or more RUs:
      the first group of one or more RUs comprises a RU of size 484, and the second group of one or more RUs comprises a RU of size 996,
      the first group of one or more RUs comprises one RU of size 242 and another RU of size 242, and the second group of one or more RUs comprises a RU of size 996,
      the first group of one or more RUs comprises one RU of size 484 and another RU of size 242, and the second group of one or more RUs comprises one RU of size 484 and another RU of size 242, or
      the first group of one or more RUs comprises one RU of size 484 and another RU of size 242, and the second group of one or more RUs comprises a RU of size 996, and
   wherein, in an event that the plurality of groups of one or more RUs comprise at least four groups of one or more RUs:
      the first group of one or more RUs comprises a RU of size 484, the second group of one or more RUs comprises a RU of size 996, a third group of one or more RUs comprises a RU of size 484, and a fourth group of one or more RUs comprises a RU of size 996,
      the first group of one or more RUs comprises one RU of size 484 and another RU of size 242, the second group of one or more RUs comprises a RU of size 996, the third group of one or more RUs comprises one RU of size 484 and another RU of size 242, and the fourth group of one or more RUs comprises a RU of size 996, or
      the first group of one or more RUs comprises one RU of size 484 and another RU of size 242, the second group of one or more RUs comprises one RU of size 484 and another RU of size 242, the third group of one or more RUs comprises one RU of size 484 and another RU of size 242, and the fourth group of one or more RUs comprises one RU of size 484 and another RU of size 242.

19. The apparatus of claim 15, wherein, in interleaving the one or more combinations of the multiple RUs of the plurality of RUs by using the one joint interleaver, the processor is configured to interleave the a first group of one or more RUs and the second group of one or more RUs of the plurality of RUs by using the one joint interleaver, wherein, in an event that the size of each RU of the multiple RUs is less than the predefined size:
another $D_{TM}$ corresponding to the first group of one or more RUs is 4 or 6, and
a first tone mapping distance with dual-carrier modulation ($D_{TM\_}D_{CM}$) corresponding to the first group of one or more RUs is 3, and a second $D_{TM\_}D_{CM}$ corresponding to the second group of one or more RUs is 3, and wherein, in an event that the size of each RU of the multiple RUs is greater than or equal to the predefined size and the multiple RUs are within one contiguous frequency segment of the predefined bandwidth:
the first group of one or more RUs comprises one RU of size 242 and another RU of size 242, and the second group of one or more RUs comprises one RU of size 242 and another RU of size 484,
a first tone mapping distance ($D_{TM}$) corresponding to the first group of one or more RUs is 12, and a second $D_{TM}$ corresponding to the second group of one or more RUs is 18, and
a first tone mapping distance with dual-carrier modulation ($D_{TM\_}D_{CM}$) corresponding to the first group of one or more RUs is 9, and a second $D_{TM\_}D_{CM}$ corresponding to the second group of one or more RUs is 9.

20. The apparatus of claim 15, wherein, in interleaving the one or more combinations of the multiple RUs of the plurality of RUs by using multiple tone interleavers, the processor is configured to interleave by using two separate tone interleavers of the processor on the one or more combinations of multiple RUs of the plurality of RUs over two separate 80-MHz frequency segments, wherein the one or more combinations of multiple RUs comprise the first group of one or more RUs and the second group of one or more RUs, and wherein:

the first group of one or more RUs comprises a RU of size 484, and the second group of one or more RUs comprises a RU of size 996, the first group of one or more RUs comprises one RU of size 242 and another RU of size 242, and the second group of one or more RUs comprises a RU of size 996, the first group of one or more RUs comprises one RU of size 484 and another RU of size 242, and the second group of one or more RUs comprises one RU of size 484 and another RU of size 242, or the first group of one or more RUs comprises one RU of size 484 and another RU of size 242, and the second group of one or more RUs comprises a RU of size 996.

* * * * *